(12) United States Patent
Son

(10) Patent No.: US 7,266,546 B2
(45) Date of Patent: Sep. 4, 2007

(54) CONTENT/INFORMATION SEARCH SYSTEM

(75) Inventor: Chan Soo Son, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 336 days.

(21) Appl. No.: 10/095,687

(22) Filed: Mar. 13, 2002

(65) Prior Publication Data

US 2003/0046281 A1 Mar. 6, 2003

(30) Foreign Application Priority Data

Sep. 5, 2001 (JP) ............................ 2001-269357
Feb. 14, 2002 (JP) ............................ 2002-037304

(51) Int. Cl.
*G06F 7/00* (2006.01)
*G06F 17/30* (2006.01)
(52) U.S. Cl. .............................................. 707/3; 707/5
(58) Field of Classification Search .................... 707/3, 707/5, 4, 10, 2, 7; 709/203, 217
See application file for complete search history.

(56) References Cited

U.S. PATENT DOCUMENTS

| 5,220,625 | A | * | 6/1993 | Hatakeyama et al. ....... 345/809 |
| 5,745,882 | A | * | 4/1998 | Bixler et al. ............... 705/26 |
| 6,185,553 | B1 | * | 2/2001 | Byrd et al. .................. 707/3 |
| 6,314,420 | B1 | * | 11/2001 | Lang et al. .................. 707/3 |
| 6,405,175 | B1 | * | 6/2002 | Ng ............................. 705/14 |
| 6,484,162 | B1 | * | 11/2002 | Edlund et al. ............... 707/3 |
| 6,523,037 | B1 | * | 2/2003 | Monahan et al. ........... 707/10 |
| 6,631,367 | B2 | * | 10/2003 | Teng et al. .................. 707/3 |
| 6,772,194 | B1 | * | 8/2004 | Goldschmidt ............ 709/203 |
| 2002/0165856 | A1 | * | 11/2002 | Gilfillan et al. ............. 707/3 |
| 2004/0068495 | A1 | * | 4/2004 | Inaba et al. ................. 707/3 |

\* cited by examiner

*Primary Examiner*—Sam Rimell
*Assistant Examiner*—Jacob F. Betit
(74) *Attorney, Agent, or Firm*—Oliff & Berridge, PLC

(57) ABSTRACT

An information search system that enables efficient collection of information and support of formation of groups which people who share a same interest can join over a network. This system includes an intermediate server and a central server, wherein the intermediate server retains indexes for searching the content database on the central server. Users issue a search request to the intermediate server and search results are returned and recorded on the intermediate server as a search history. The search history is shared by users and used as references from which retrievable content can be selected.

15 Claims, 18 Drawing Sheets

USER REGISTRATION DIALOG BOX

FILL IN THE FOLLOWING FIELDS AND CLICK THE "REGISTER" BUTTON. YOU WILL BE REGISTERED WITH THE SERVER YOU SELECTED. YOU CAN CHANGE THE SETTINGS AND USER ID LATER TO REGISTER WITH ANOTHER SERVER.

| | |
|---|---|
| USER ID: | pm_koizumi |
| DEFAULT SERVER: | MUSIC ▼ |
| DEFAULT CATEGORY: | CLASSICAL ▼ |
| RECORD/DO NOT RECORD HISTORY: | RECORD HISTORY IN STANDARD MODE ▼ |
| SEARCH HISTORY OPEN/CLOSED: | OPEN IN STANDARD MODE ▼ |
| WILL YOU USE REFERENCE TO OTHER SERVERS? | YES ▼ |

[ REGISTER ]  [ CANCEL ]

Fig.5

SEARCH WINDOW

CATEGORY SELECTED NOW: CLASSICAL

SEARCH FORMULA: 4*ITALIAN      (C)

HISTORY SEARCH    EXECUTE

TERMINATE   ▶

SEARCH RESULTS:

| 1 | BACH | 54,649 HITS | DELETE |
|---|---|---|---|
| 2 | 1*INSTRUMENTAL | 14,649 HITS | DELETE |
| 3 | 2*PIANO | 2,649 HITS | DELETE |
| 4 | 3*PURE TEMPERAMENT | 322 HITS | DELETE |
| 5 | 4*JAPANESE | 75 HITS | DELETE |
| 6 | 3*ITALIAN | 5 HITS | DELETE |

WINDOW, LIST OF HISTORY RECORDS BY SEARCH FORMULA

CATEGORY: CLASSICAL

SEARCH FORMULA: 4*JAPANEASE

HITS: 1,621

| | | | |
|---|---|---|---|
| 1 | xxxx | 2001/04/13 | Ref.TO A SERIES OF SEARCH RESULTS |
| 2 | PIANO CONCERTO, *BRAHMS* | 2001/04/13 | Ref.TO A SERIES OF SEARCH RESULTS |
| 3 | FRANCE, MODERN | 2001/04/13 | Ref.TO A SERIES OF SEARCH RESULTS |
| 4 | CHOPIN, SONATA, LIFE | 2001/04/13 | Ref.TO A SERIES OF SEARCH RESULTS |
| 5 | *MOZART*, BASSOON | 2001/04/13 | Ref.TO A SERIES OF SEARCH RESULTS |
| 6 | *TCHAIKOVSKY* CONTEST | 2001/04/13 | Ref.TO A SERIES OF SEARCH RESULTS |

Fig.12

WINDOW, PAST SEARCH RESULTS

CATEGORY SELECTED NOW: | CLASSICAL | ▶

SEARCH FORMULA: [ ]

[HISTORY SEARCH] [EXECUTE]
[TERMINATE]

SEARCH RESULTS:

| 1 | XXXX | 3,288 HITS | DELETE |
|---|---|---|---|
| 2 | 1*PIANO | 422 HITS | DELETE |
| 3 | 1*GUITAR | 98 HITS | DELETE |

HISTORY SEARCH WINDOW

CATEGORY SELECTED NOW: | CLASSICAL | ▶

SEARCH RANGE: | SELECTED CATEGORY ONLY | ▶

SEARCH FORMULA: [ ]

[CONTENT SEARCH] [EXECUTE]

[TERMINATE]

SEARCH RESULTS: (Q)

| | | |
|---|---|---|
| 1 | * | 3,243,559 HITS |
| 2 | INSTRUMENTAL | 883,837 HITS |
| 3 | PURE TEMPERAMENT | 8,353 HITS |
| 4 | 3*JAPANESE | 1,621 HITS |

WINDOW, PAST SEARCH BY OTHER SEEKERS

CATEGORY SELECTED NOW: CLASSICAL ▼

SEARCH FORMULA: * EXECUTE

HISTORY SEARCH | TERMINATE

SEARCH RESULTS: HIT 198 SEARCHERS

| | | |
|---|---|---|
| 1 | aaaa | 233 HITS |
| 2 | bbbb | 192 HITS |
| 3 | cccc | 98 HITS |
| 4 | dddd | 98 HITS |
| 5 | eeee | 88 HITS |
| 6 | ----- | 62 HITS |
| 7 | ----- | 61 HITS |

Fig. 15

WINDOW 2, LIST OF HISTORY RECORDS BY SEARCH FORMULA

SEARCH HISTORY OF USER <u>bbbb</u> CATEGORY: CLASSICAL

SEARCH FORMULA: *

HITS: 88

[ SHOW COMMENT LIST ]   [ REVERT ] — R

S ↓

C — "I WANT TO LISTEN TO DIVERSE ARTISTS. I RECOMMEND XXX'S PERFORMANCE."

| | | | |
|---|---|---|---|
| 1 | BACH | | 2001/04/13 |
| 2 | 1*CANTATA | | 2001/04/13 |
| 3 | 1*ORATORIO | | 2001/04/13 |
| 4 | 2*ORGAN | | 2001/04/13 |
| 5 | 2*(PIANO+GUITAR) | | 2001/04/13 |
| 6 | VOCAL | | 2001/04/14 |

Fig. 16

COMMENTS LIST WINDOW

LIST OF bbbb'S COMMENTS CATEGORY: CLASSICAL

SEARCH FORMULA: *

HITS: 18

[REVERT]

| | | | |
|---|---|---|---|
| 1 | I WANT TO LISTEN TO DIVERSE ARTISTS. I RECOMMEND xxx'S PERFORMANCE | 2001/04/13 | JUMP |
| 2 | YYY'S CANTATA IN THIS RECORDING IS RARELY BEAUTIFUL | 2001/04/13 | JUMP |
| 3 | SEARCH FOR COMPOSITIONS WRITTEN BY RATHER MINOR COMPOSERS. | 2001/04/13 | JUMP |
| 4 | INVESTIGATE | 2001/04/13 | JUMP |
| 5 | SEARCH FOR COMPOSITIONS WRITTEN BY ITALIAN COMPOSER's IN THE 17th CENTURY | 2001/04/13 | JUMP |
| 6 | MAKE A LIST OF COMPOSERS IN THE 20th CENTURY | 2001/04/14 | JUMP |

Fig. 17

CONTENT/INFORMATION SEARCH SYSTEM

BACKGROUND OF THE INVENTION

1. Field of the Invention

The present invention relates to an information search system for searching for information/content that is distributed over a network.

2. Description of Related Art

The development of the Internet has made it possible for many people to enjoy collecting information in a field of their interest via this global network. In the Internet environment, however, web servers and the like are separately provided, and, consequently, often information in a field is widely distributed and cannot be efficiently obtained. In order to collect sufficient information, some people who share the same interest form a Closed Interest Group (CIG) in which quite highly specialized information is exchanged.

However, because the CIG uses a Bulletin Board System (BBS), information is accumulated through the process of exchanging a message and a replies. Although fragmentary information can be collected, the CIG system is not suitable for intensively obtaining a great deal of information.

With an information search or collection system based on a conventional BBS, it is difficult for a seeker to efficiently collect information about a particular object of interest. In such a system, the only way to find out whether another person in the CIG shares your interest is to read messages from the person and form an opinion based on that information. For example, if there exists a CIG for the Japanese chess-like game of shogi, its members may be fond of different forms of tactical deployment of the shogi pieces. For example, there is no way for a member who is fond of one style of play, such as that known as "shiken-bisha" to find other members who also like "shiken-bisha." Although conventional BBS systems allow users to find others who share the same general interests, such as "shogi", in those systems it is relatively difficult to find among participants another user sharing an interest in a rather minor specialized field. Therefore, many users are dissatisfied with such systems.

SUMMARY OF THE INVENTION

The present invention has been devised to address the above circumstances of information search. The object of the present invention is to provide an information search system that enables efficient collection of information with considerations of forming groups which people who share a same interest can join through a network.

In order to solve the above-described problems of previous information search or collection systems based on the BBS system, the present invention provides, in one aspect, an information search system for providing user terminals with a search service for content on a central server including a database in which content is stored (the database will be referred to as a content database hereinafter). This information search system includes an intermediate server located between the central server and the user terminals. The intermediate server comprises device for receiving a user search request from a user terminal, searching the content database on said central server on behalf of the user terminal, and presenting search results to the user terminal; and device for recording and retaining the search results returned by the search request as user search history, wherein the above search results and the results of past searches requested by the user are recorded together. The information search system makes available to users the user search history so that the search history is shared across the users and used for support of the users' search operations.

In another aspect, the present invention provides an information search system for providing user terminals with a service for searching content stored on a central server including a content database, the information search system including a plurality of intermediate servers located between the central server and the user terminals and specialized for predetermined fields of user interest. Each of the plurality of intermediate servers comprises device for receiving a user search request from a user terminal, searching the content database on said central server on behalf of the user terminal, and presenting search results to the user terminal; and device for recording and retaining the search results returned by the search request as a user search history, wherein the above search results and the results of past searches by request of the user are recorded together. Each of the user terminals retains the identifier of an intermediate server selected by its user as the one to which a search request is issued, wherein the user can select another intermediate server in place of the intermediate server. The information search system provides the user search history to other users so that the search history is shared by users and used for support of user search operations.

In a further aspect, the present invention provides an intermediate server located between a central server on which is stored a content database and user terminals for accessing the intermediate server to obtain content stored on said central server. The intermediate server comprises device for receiving a search request from a user terminal operated by a user, searching the content database on said central server on behalf of the user terminal, and presenting search results to the user terminal; and device for recording and retaining the search results returned by the search request as search history per user, wherein the search results and the results of past searches performed at the request of the user are recorded together. The intermediate server makes the user search history per available to users so that the search history can be shared by users and used to support user search operations.

An advantage of the invention is that the user search history is shared across the users in this way and this allows the users to search for content in the field of interest while referring to the search history. Reference to the search history makes it easier for a user to other users who have the same interest as the user and can be used for forming clubs or groups Internet.

In yet another aspect, the present invention provides intermediate servers located between a central server including a content database and user terminals that access one of the intermediate servers to retrieve content stored on said central server, each of said intermediate serves being specialized for a fields of user interest regarding content. Each intermediate server comprises device for receiving a search request from a user terminal, searching content falling within its specialized field in the content database on said central server on behalf of the user terminal, and presenting search results to the user terminal; device for recording and retaining the search results returned by the search request as a user search history, wherein said search results and the results of past searches by request of the user are recorded together; device for retaining information about other intermediate servers' specialized fields; and device for searching other intermediate servers with a field key and presenting search results to the user terminal. The intermediate servers provide the user search history to users so that the search history can be shared by users to support their search operations.

The foregoing intermediate server may further comprise device for receiving a request to retrieve content from a user terminal, retrieving the content from the central server, and distributing the content to the user terminal. When the user has issued the request to get content that was selected by making reference to search history of another user, preferably, the intermediate server executes a process of rewarding the other user. This would induce users to make their search history open.

Furthermore, the search history includes information about when the search was executed. When a predetermined period has elapsed after the time when the search was executed, it is preferable to delete the search history.

Furthermore, the search history may include an evaluation by another user who referenced it. It is preferable that the evaluation information be in the processing for presenting the search history.

In a still further aspect of the present invention, the present invention provides an information search method for searching a content database on a central server by user request. The information search method comprises the steps of receiving a search request from a user; searching the content database on the central server; presenting search results to the user; and recording and retaining the search results returned by the search request as a user search history, wherein the above search results and the results of past searches by request of the user are recorded together. In this method, the user search history is rendered to users so as to be shared across the users and used for support of the users' search operations.

In yet another aspect, the present invention provides a computer-readable medium having an information search program stored thereon, the information search program for searching contents by user request, using a content database. This program comprises a module for causing the computer to execute the steps of receiving a search request from a user, searching the content database on said central server, and presenting search results to the user; and a module for causing the computer to execute the step of recording and retaining the search results returned by the search request as a user search history, wherein the above search results and the results of past searches by request of the user are recorded together. Through this program, the user search history is rendered to users so as to be shared across the users and used for support of the users' search operations.

Preferably, a predetermined amount of money should be set as a limit for the rewards to be given to another user, and, when said predetermined amount is exceeded, no further reward is given.

In a further aspect, the present invention provides a central server including a content database from which content is distributed to user terminals by request and connecting to an intermediate server located between the central server and the user terminals. The intermediate server receives a search request of a user from a user terminal, searches the content database on said central server on behalf of the user terminal, presents search results to the user terminal, and records the search results as search history. The central server comprises device which, when a first user has performed a content search operation, generates key data to be attached to the search history record of the first user and retains the key data liked with the first user identifying information; device for sending the thus generated key data to the first user's terminal device; and device which, when a second user gets content selected by making reference to the search history record of the first user, identifies the first user by verifying matching between the key data included in the referenced search history record of the first user and the key data retained. The first user's terminal device encrypts the key data with the first user's pre-assigned private key and the encrypted key data is incorporated into the search history record at the intermediate server. When the second user makes reference to the search history record, the encrypted key data is further encrypted with the second user's pre-assigned private key and the double encrypted key data is sent to the central server. Then, the above device for identifying the first user decrypts the double encrypted key data with the first user's and second user's private keys and, using the thus reproduced key data, verifies key data matching.

In a still further aspect, the present invention provides a method of rewarding a searcher, using a central server including a content database from which content is distributed to user terminals by request. The central server connects to an intermediate server located between the central server and the user terminals. The intermediate server receives a search request from a user terminal of a user, searches the content database on said central server on behalf of the user terminal, presents search results to the user terminal, and records the search results as search history. The above method comprises a step in which, when a first user has performed a content search operation, key data to be attached to the search history record of the first user is generated and retained, linked with the first user identifying information; a step of sending the generated key data to the first user's terminal device; and a step in which, when a second user gets content selected by making reference to the search history record of the first user, the first user is identified by verifying matching between the key data included in the referenced search history record of the first user and the key data retained. The first user's terminal device encrypts the key data with the first user's pre-assigned private key and the encrypted key data is incorporated into the search history record at the intermediate server. When the second user makes reference to the search history record, the encrypted key data is further encrypted with the second user's pre-assigned private key and the double encrypted key data is sent to the central server. The above step in which the first user is identified may comprises steps of decrypting the double encrypted key data with the first user's and second user's private keys and verifying key data matching, using the thus reproduced key data. In this method, a reward is credited to the thus-identified first user.

BRIEF DESCRIPTION OF THE DRAWINGS

FIG. 5 shows an example dialog box for user registration in a graphical user interface (GUI) for the preferred embodiment of the invention.

FIG. 9 shows an example past search results window in a GUI for the preferred embodiment of the invention.

FIG. 12 shows an example history records window in a GUI for the preferred embodiment of the invention.

FIG. 13 shows another example past search results window as a GUI in a GUI for the preferred embodiment of the invention.

FIG. 14 shows another example history search window in a GUI for the preferred embodiment of the invention.

FIG. 15 shows an example window showing past searches by other users, used in a GUI for the preferred embodiment of the invention.

FIG. 16 shows another example search history window in a GUI for the preferred embodiment of the invention.

FIG. 17 shows an example comments list window in a GUI for the preferred embodiment of the invention.

DESCRIPTION OF THE PREFERRED EMBODIMENT

Figure 1:
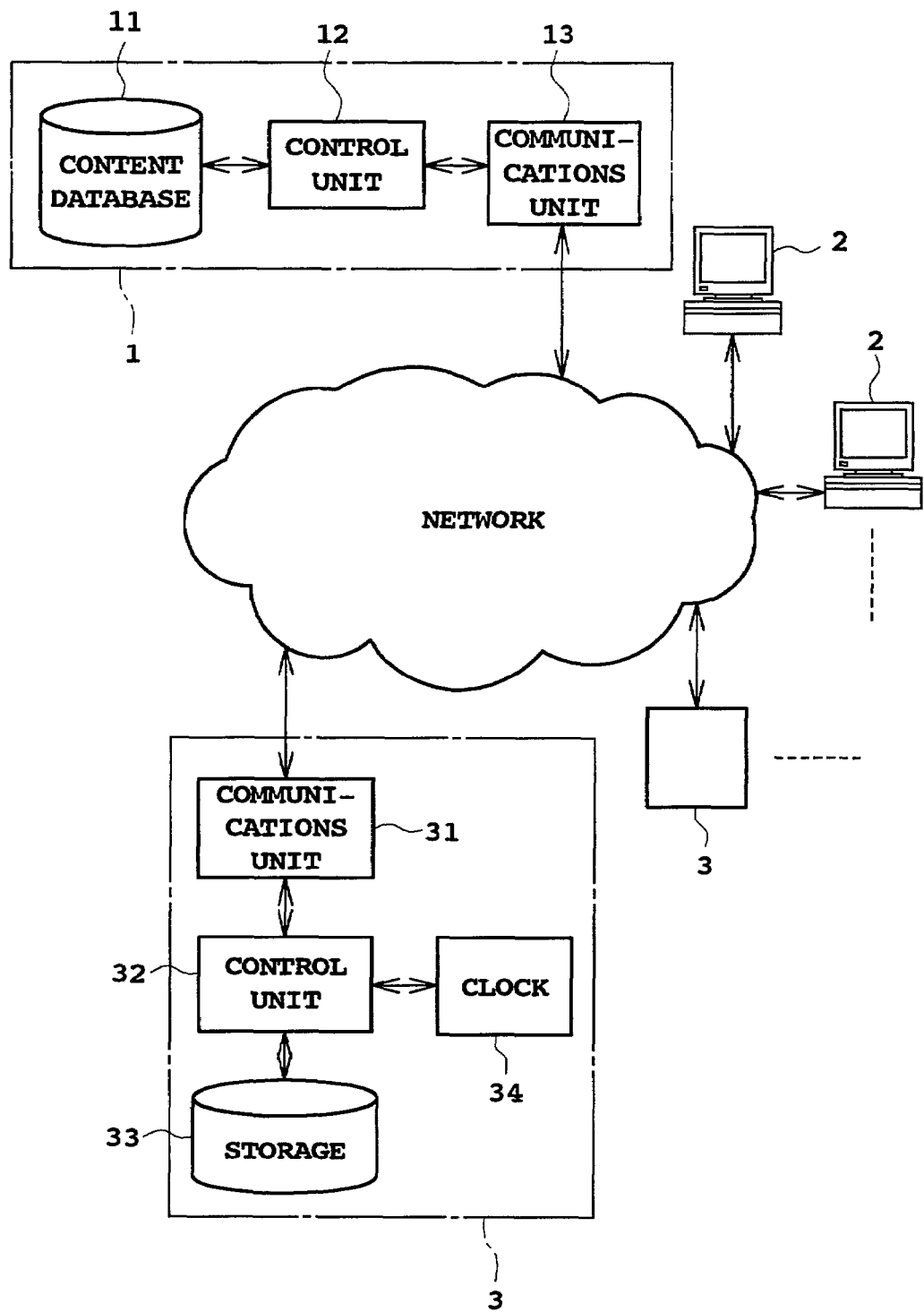
FIG. 1 is a structural block diagram of an information search system configured in accordance with a preferred embodiment of the present invention.

A preferred embodiment of the present invention will now be described hereinafter with reference to the accompanying drawings. Referring to FIG. 1, an information search system configured in accordance with a preferred embodiment of the present invention essentially consists of a central server 1, user terminals 2, and one or more intermediate servers 3. The central server 1 comprises a content database 11 on which content has been stored, a control unit 12, and a communications unit 13. The intermediate server 3 comprises a communications unit 31, control unit 32, storage 33, and clock 34. Any of the central server 1, user terminals 2, and intermediate servers 3 may be a computer that reads and executes a program stored on a computer-readable recording medium including a magneto-optic (MO) disc, CD-ROM, hard disc, etc.

The central server 1 is embodied in, for example, a server computer that runs under the management of an information distributor. Data content supplied by the information distributor is stored in the content database 11. In response to a request from an intermediate server 3 received by the communications unit 13, the control unit 12 distributes content retrieved from the content database 11 to the intermediate server. When the content database 11 is updated, the control unit 12 notifies the intermediate server(s) 3 of the update information. One noticeable feature of the present preferred embodiment is that the control unit 12 authenticates the intermediate server 3 when it accepts request therefrom.

Furthermore, the control unit 12 charges for the content distributed to an intermediate server 3 and notifies the intermediate server 3 of the charge. While only one central server 1 is shown in FIG. 1, a plurality of central servers 1 may be provided.

The communications unit 13 connects to a network, receives request transmitted across the network 13 from an intermediate server 3, and outputs the request to the control unit 12. The communications unit 13 also transmits a diversity of data, according to the instructions issued from the control unit 12.

A user terminal 2 is, for example, a general personal computer that connects to the intermediate server 3 via the network. In the user terminal 2, software for requesting the intermediate server 3 to execute a search and receiving search results and software for viewing content data are installed.

An intermediate server 3 can also be embodied in a general server computer wherein a communications unit 31 transmits and receives data over the network according to instructions issued from a control unit 32. The control unit 32 essentially executes the following: a process of generating and managing index information for searching the content database on the central server 1 (index management process); a process of searching for content data requested in a search request from a user (search process); a process of retrieving content data on behalf of the user and transferring it to the user (content retrieval and relaying process); a process of creating and storing a user-specific search history (search history storing process); and a process of rendering search history to be shared by users (search history rendering process). The above processes are described in detail further below. Information stored in the storage 33 includes indexes, user authentication data, and user-specific search history. The clock 34 keeps date and time in real time.

The processes that are executed by the control unit 32 of an intermediate server 3 will now be explained, beginning with the index management process.

[Index Management Process]

The control unit 32 generates indexes for searching the content database on the central server 1 and stores these in the storage 33. When the content database on the central server 1 is updated, the control unit 32 updates the indexes based on update information received from the central server 1. Because the indexes can be obtained by indexing as commonly practiced in the art, further explanation thereof is not made.

Because multiple intermediate servers may be provided in the system of the present embodiment, the central server 1 has a list of the address (es) of intermediate server(s) 3 to which the content database update information is sent.

[User Registration]

A user must first register with any intermediate server. The control unit 32 uses user registration data to authenticate a user. Using a user registration window of graphical user interface (GUI), a user enters his or her nickname (user ID) and password and chooses whether to have search history recorded by default or whether to make search history open by default. The control unit 32 stores the input user information on the storage 33.

[Search Process]

When an intermediate server receives a search request from a user terminal 2, its control unit 32 send a request for the user ID and password. The control unit 32 receives the user ID and password entered by the user and compares them with the pre-registered user ID and password, thereby authenticating the user. When it has been verified that the user issuing the request is the registered user as the result of authentication, the search process begins.

In the search process, the intermediate server's control unit receives input search criteria (such as keywords), searches the indexes stored in the storage according to the search criteria, and returns search results to the user terminal 2.

Specifically, the control unit 32 can implement this process by presenting a GUI web page to the user. The authenticated user ID is embedded in the web page, which displays a keyword input field and a search button. When the user clicks the search button, the intermediate server receives the embedded user ID and the keyword(s) as a query, and the control unit executes the program for searching for content matching the keyword(s) (search criteria).

In this way, the intermediate server having the indexes for searching the content database, rather than of the central server 1, executes the search. Therefore, the intermediate server can execute a search without disclosing search history to the central server 1. In other words, this search manner is useful for enhancing security in such a way that, for example, a firewall and a proxy server can be provided between the intermediate server 3 and the central server 1. By doing so, additional security can be provided to a level such there is little realistic fear that another organization would be able to illegally reference the search history. This function of the intermediate server 3 is particularly desirable when a search relates to information, such as patent information or intellectual property, for which secrecy is desired.

[Search History Storing Process]

When the intermediate server presents search results to the user, the user is asked whether or not the search results should be recorded as search history data. When the intermediate server is requested to record the search results as search history data, the control unit 32 prompts the user to enter character strings (comments) explaining the goal of the search (the results desired by the user). These comments differ from keywords and consist of words in which the user subjectively states what kind of information he or she seeks; for example, "Through this search, I obtained shogi diagrams for recent professional matches in which 'shiken-bisha' was used; there were only a small number of hits, but the results can be used for reference." On the other hand, as the criteria for a search that can actually be employed, the user should specify a specific period rather than a relative term like "lately" and should only use discrete and objective words such as "shiken-bisha" and "shogi diagram".

Figure 2:
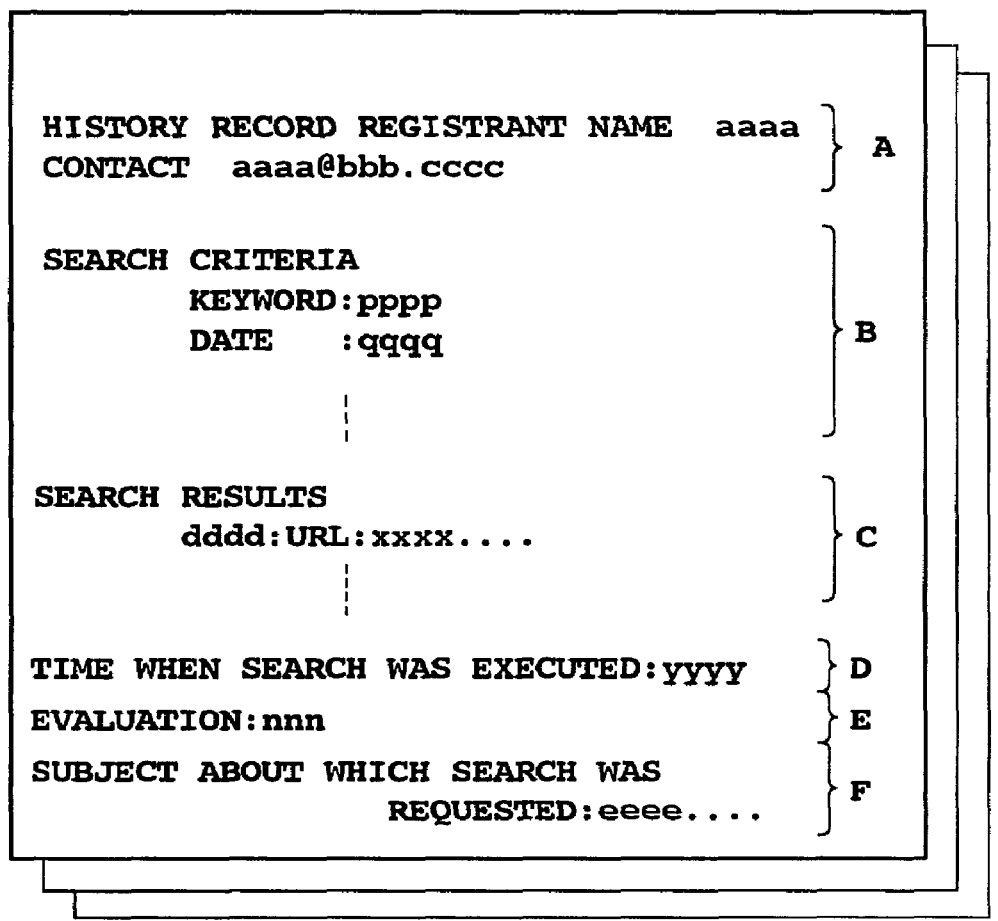
FIG. 2 illustrates an example search history.

Then, the control unit 32 executes the search history filing process in which the user ID by which the search request user is identified, the comments, the search criteria, and the search results are stored in the storage 33 as one data set. Search history data records are accumulated in the storage 33. A search history record consists of entries such as, for example, those that are shown, in FIG. 2. In this example, the entries consist of a user ID (history record registrant name) which is used as the key of the record, contact to the user (registrant) (A), specified search criteria (B), search results (C), time when the search was executed (D) according to the clock 34, evaluation (E), and comments (F). The possible contact to the registrant may be an e-mail address, the URL of a web site/homepage, or an Internet Relay Chat (IRC) identifier for the registrant of the search history record. Prior to processing, the evaluation is set at an initial value, for example, "0."

In this preferred embodiment, after executing a search, the intermediate server prompts the user to input comments which are recorded as a part of the history record of the search. This step is intended to collect information reflecting the actual circumstances of user search request activity. Often, users will refine search criteria and input a number of search requests before obtaining desired search results. During this process, the user's interest may change and the user may begin to seek a different type of information. Such evolution of search criteria can be reflected in the search history record.

[Search History Rendering Process]

Another notable feature of the present preferred embodiment is that the control unit 32 of an intermediate server makes the accumulated search history records available to a user when the user requests a search so that the search history information can be shared by users. The control unit 32 analyzes the comments entered with a search request, retrieves search history records related to the comments from the storage, and provides these to the user. Analysis of the comments and retrieval of search history records can be carried out using any suitable, commonly known comparison manner for finding analogous phrases.

Figure 3:
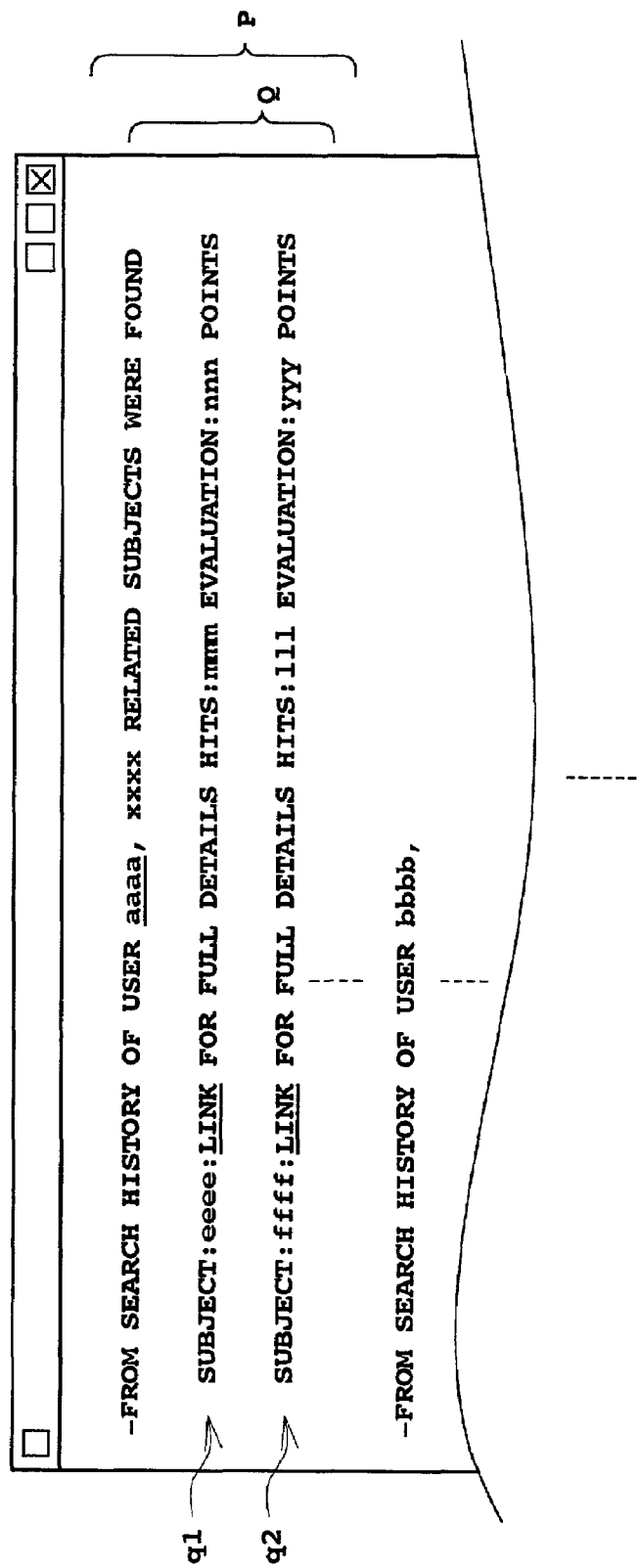
FIG. 3 shows an example of display of a search history on a user terminal.

FIG. 3 exemplifies presentation of search history records. Search history records of a registrant are shown in the display area (P) within which the records (Q) of the registrant are listed. Each search history record (q1, q2, . . . qn) includes data on the subject of the search and the state of the search results (the number of "hits" of searched content titles) with the embedded link to further information for the record. When the viewer clicks the hypertext link, further information of the record is displayed, such as the registrant name as the key, the contact to the registrant, the specified conditions of the search, search results, time when the search was executed, evaluation, and comments. In the name string of the registrant of a history record in FIG. 3, the link to the contact to the registrant is embedded. If, for example, the registrant's e-mail address is embedded as the contact, when the viewer clicks at the registrant name, the GUI window for sending e-mail to the registrant appears.

The control unit 32 obtains the evaluation of a rendered search history record from the user (viewer of the search history) and updates the evaluation included in the record. The referential usefulness of the record is graded in, for example, five levels for which values of "2," "+1," "0, " "−1," and "−2" are assigned respectively. When the viewer specifies one of the levels, the control unit updates the current evaluation by adding the value corresponding to the level. Moreover, the control unit 32 deletes search history records older than a certain time from which predetermined days has passed out of the storage 33 by referring to the clock 34.

Furthermore, the user can attach a bookmark to a search history record. When the user attaches their bookmark to a search history record, the control unit 32 links the viewer name to the registrant name and stores this link as the bookmark when again storing the record in the storage. Upon receiving a user request to reference the bookmark, the control unit reads the registrant name linked with the viewer from the stored bookmark. Using the registrant name as the key, the control unit retrieves that user's search history records from the storage 33. By using bookmarks, a user can again reference the search history of a specific registrant by simple operation. The user can search for content using the search history of a previous searcher sharing an interest in the same topic. By doing so, the viewer can more efficiently collect information.

[Content Retrieval and Relaying Process]

In the content retrieval and relaying process, when the control unit 32 of an intermediate server receives a request for content selected by the user from the content list presented as a search result, it sends to the central server 1 a request for the selected content. The control unit 32 then receives the content distributed in response to the request and transfers it to the user terminal 2. In this way, because the intermediate server 3 retrieves content from the central server 1 on behalf of the user terminal 2, the central server 1 authenticates the intermediate server 3 instead of authenticating the user. Therefore, user management to be exercised by the central server 1 is greatly simplified. The control unit also calculates a charge for the content distributed to each user.

A user may select content, taking advantage of the search results included in the search history referenced by the user, and issue to an intermediate server a request for that content. Upon receiving such a request, the control unit 32 sends the central server 1 the identifier of the user who issued the request and of the selected content, receives the requested content in response to the request, and transfers the content to the user terminal 2. Moreover, the control unit 32 credits the registrant of the search history referenced by the user with a predetermined reward. The reward may be, for example, that the control unit 32 discounts the charges payable by the registrant by a certain amount. The advantage may be embodied as a discount of a predetermined size from future content charges to that registrant or a cash payment to the registrant.

[Providing Intermediate Servers]

Because an intermediate server 3 executes between a user and the central server 1 processes as described above, the processing load on the intermediate server 3 may be great. It is preferable to provide separate intermediate servers 3 specialized for the fields of users' interests; that is, providing a plurality of intermediate servers 3, including, for example, an intermediate server 3 for handling access by users interested in "shogi" and another intermediate server 3 for handling access by users interested in movies. A user selects an intermediate server 3 according to the field of his or her interest and registers hits or her authentication information with that intermediate server 3.

It is also preferable to provide specialized intermediate servers for different categories within one field of interest, such as, for example, music may divided into a plurality of categories (classical, jazz, popular, etc.).

In this case, content is stored in the database on the central server 1, preferably, each content file including category information as its bibliographic information, thereby enabling the central server 1, by referring to the category information, to provide the appropriate intermediate server(s) 3 with category specific content updates.

When a new intermediate server 3 is connected to the system, the provider declares the categories (fields of interest) with which the new intermediate server 3 will communicate with the central server 1. Specifically, this declaration is a message of notice of a category sent to the central server 1. Preferably, the central server 1 then broadcasts the categories of the new intermediate server 3 and its reference information (host name, URL, IP address, etc) to other intermediate servers 3 to which the central server 1 sends update information. Thereby, each intermediate server 3 stores the category information for other intermediate servers 3 and this category information can be provided when a user is seeking an intermediate server 3 appropriate for his or her field of interest. It is preferable to predefine category codes and supply them as the category information.

Specifically, a user must specify keywords indicating the field of his or her interest as conditions of a search and send the keywords to any intermediate server 3, so that the user can search out a suitable intermediate server out of other intermediate servers 3 and obtain its reference information such as the host name of intermediate server 3 located by that search request.

Figure 4:
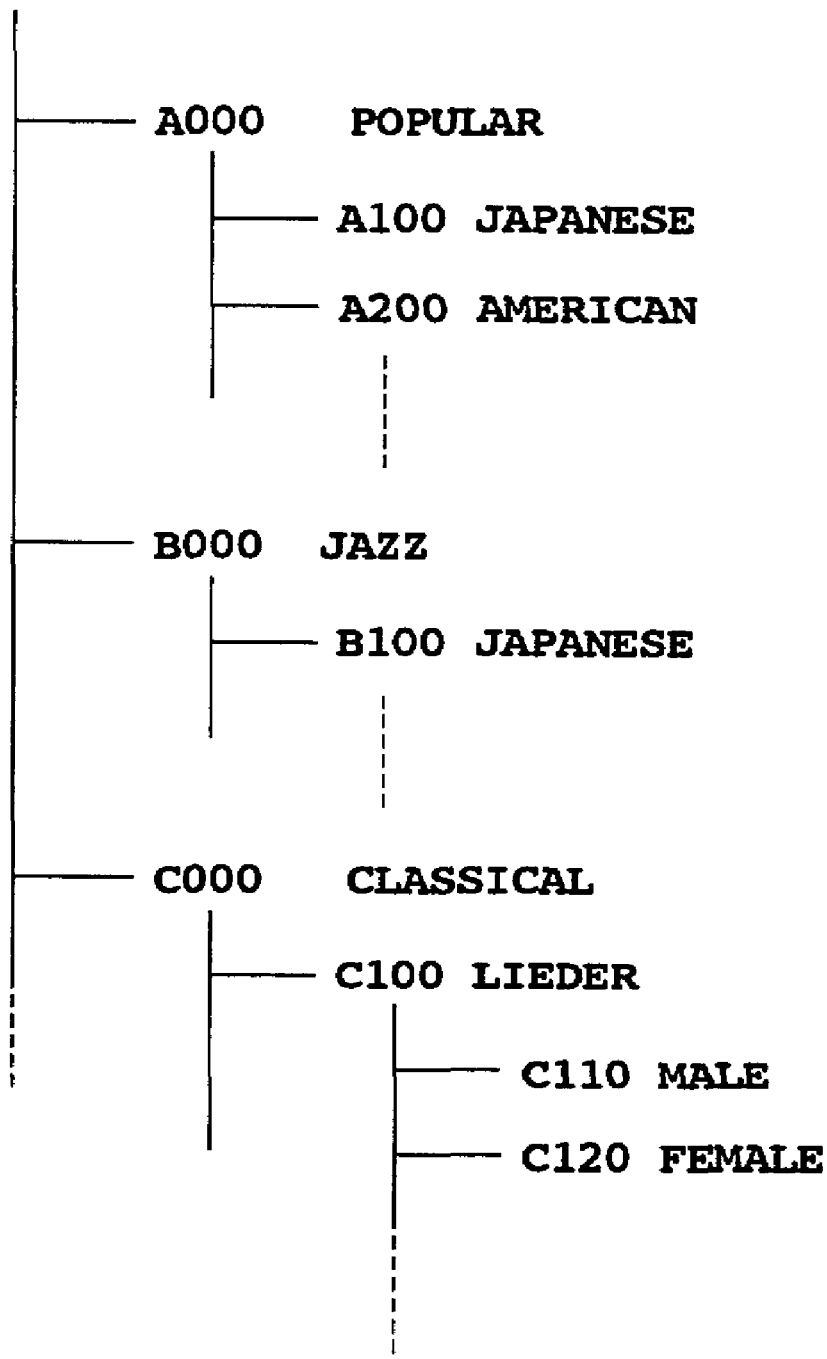
FIG. 4 illustrates examples of category classification and code assignment.

It is preferable that the category specification codes be defined in a hierarchy which accounts for categories within a field of interest, as is the case in music. An example code hierarchy is illustrated in FIG. 4, wherein the top hierarchy is "Music", the second hierarchy includes popular music "A000" and jazz"B000", the third hierarchy including "A100" standing for "Japanese popular" under the "popular" category ("Japanese popular" is a subcategory of "pops"). If the category of an intermediate server 3 is listed as "Music" it handles all music genres. If its category is "A000", it handles "popular" including, for example, both "American" and "Japanese". However, if the category is "A100", the server only deals with "Japanese pops".

When a plurality of specialized intermediate servers 3 are provided as described above, a user must select an intermediate server 3 and reference information (host name, URL, etc.) to which the user terminal connects by default and a default category (field of user interest) in which a search is executed when performing user registration. Moreover, the user must choose whether reference other intermediate servers 3. For shared data management of user registration, it is also possible to use a network database, for example, the Network Information Service Plus (NIS +) (registered trademark) database.

While one intermediate server 3 is assigned for one category or user interest in the above description, it is also possible that one intermediate server 3 executes processing to accommodate a plurality of categories or fields. This can be implemented by running a plurality of software programs on one server.

It is preferable to allow a user to change at least an intermediate server 3 and reference information as well as the category among the items set during user registration. Thereby, the user can change the intermediate server setting appropriately according to their evolving interests. It would be convenient for users that all settings entered at user registration except user name (user ID) be changeable later.

[Registering a Group with an Intermediate Server]

It is also possible to register a group consisting of a plurality of users with an intermediate server when user registration is performed. In this case, as the contact to the user (search history record registrant), either the e-mail address of a representative of a group or the e-mail addresses of all members of the group may be specified. When users are registered as the members of a group in this way, any rewards provided are awarded to the group. If, for example, the reward is a cash remuneration, the reward may be preferably shared by the members of the group.

[Current Popularity Considerations]

The control unit 32 of an intermediate server 3 records numerical data on reference to search history and content titles distributed to users and calculates the distribution of the numerical data for every predetermined period. The control unit analyzes the trend in frequency at which a seeker-specific search history has been referenced and a content title has been distributed. Based on this analysis, the control unit creates a web page containing search history records which show a greatly increasing rate of access based on the above numerical data and provides this to users by request. By providing such web pages on which search history and content accessed by a lot of people for a short period, for example, content such as information about a new song of a popular singer can be highlighted, and usability can be enhanced. An intermediate server 3 analyzes the numerical data for each category and field of user interest in order to present highlights in each category and field to users. In this way, information about current popularity can be provided.

[Operation]

The operation of the information search system of the preferred embodiment will now be explained. A user must first register with an intermediate server 3, which may be one of a plurality of intermediate servers. Specifically, a user accesses a web page for user registration, such as the GUI window shown in FIG. 5, and enters user ID, default server, and default category into appropriate fields, and chooses whether to have search history recorded by default, whether to make search history open or closed, and whether to use reference to other servers.

Figure 6:
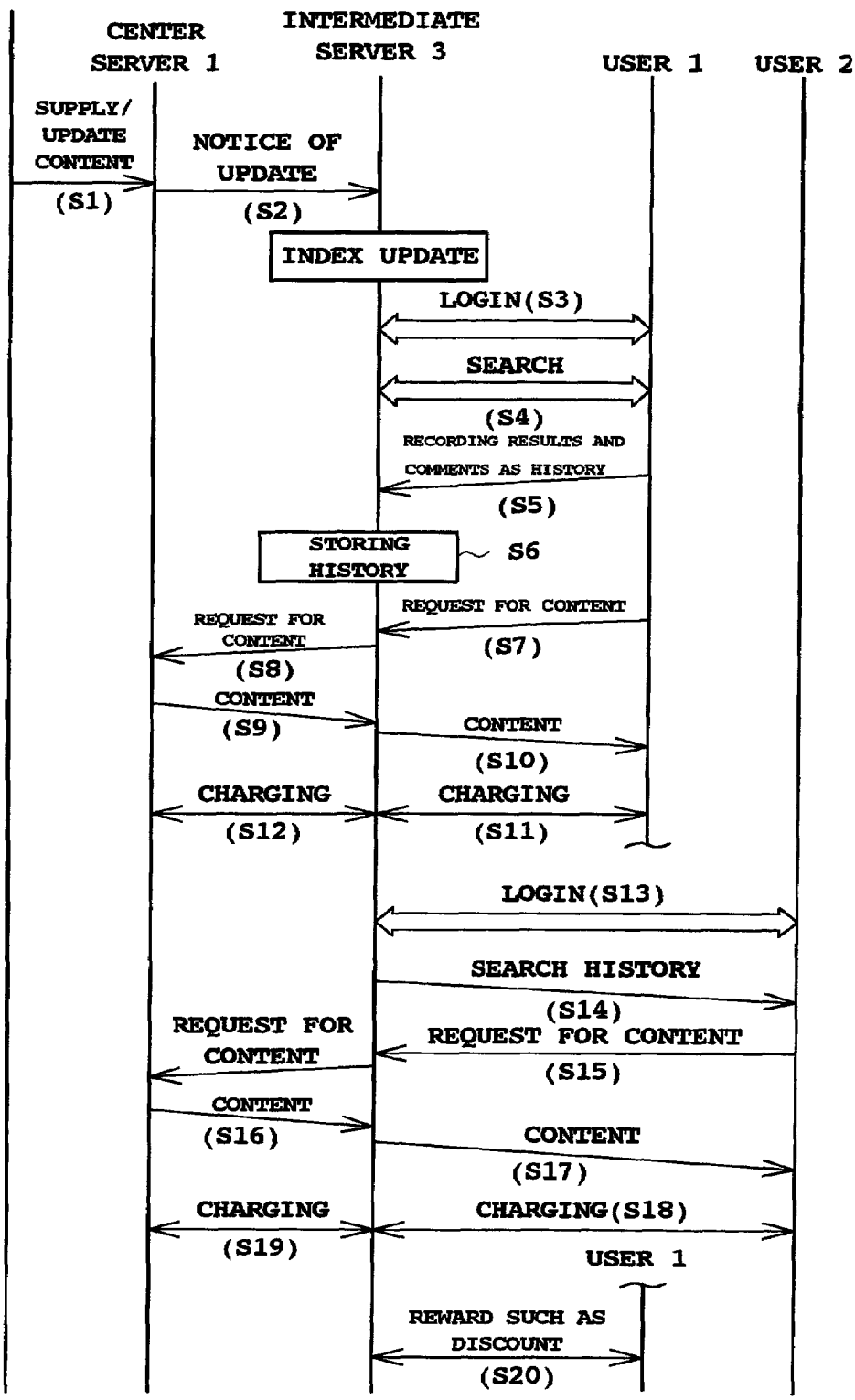
FIG. 6 is a process flow diagram illustrating the operation of the information search system of the preferred embodiment of the invention.
Figure 7:
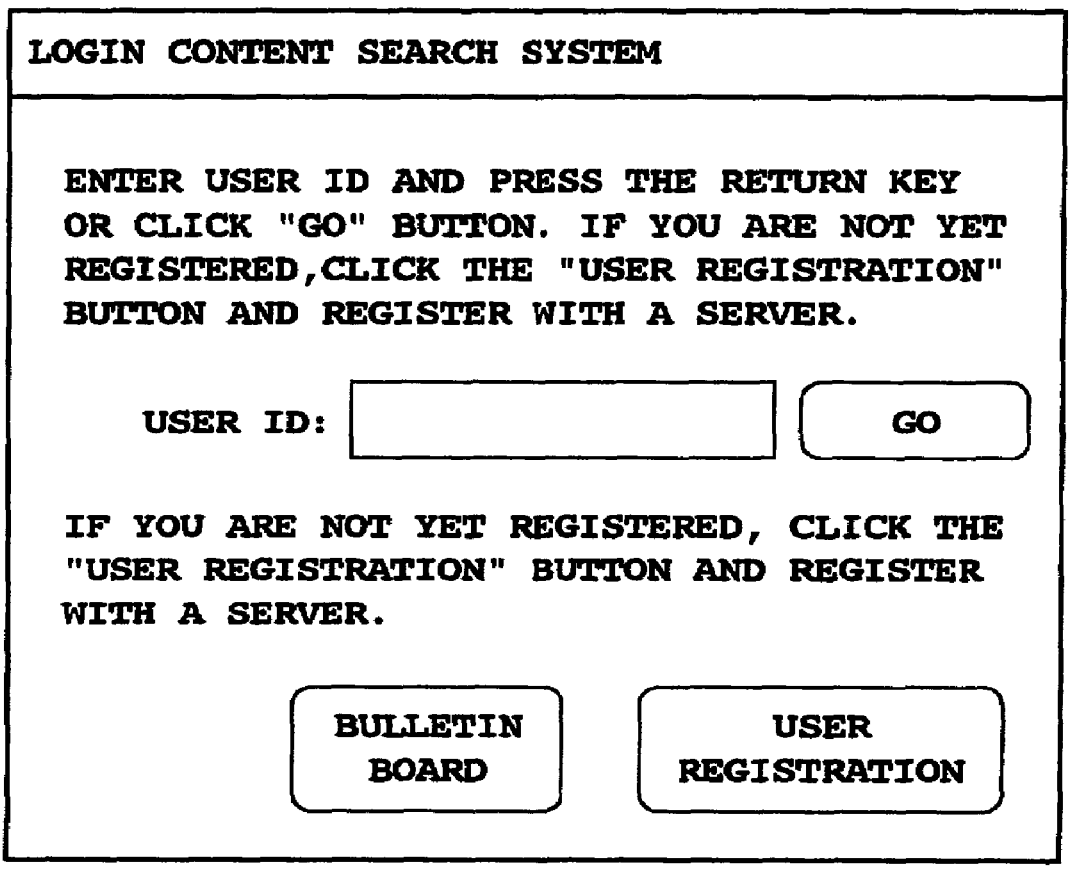
FIG. 7 shows an example login window in a GUI for the preferred embodiment of the invention.

Once a user has registered with an intermediate server, the user can open his or her search history and can reference search history of other users. Referring to FIG. 6 wherein system operation is illustrated for an example wherein the search history of a first user (search history record registrant) is referenced by a second user (viewer), the illustrative operation will be explained below.

Assuming that intermediate servers 3 are provided separately for fields of user interests and the following explanation focuses on a "Music" server. The intermediate server 3 provided for music information search enables searches on a category-specific basis.

A content distributor supplies content to the central server 1 on which the content is stored in a database (S1). When the content database is updated, the intermediate server gives notice of update to the intermediate server 3 (S2). The intermediate server 3 updates the indexes for searching the database.

Figure 8:
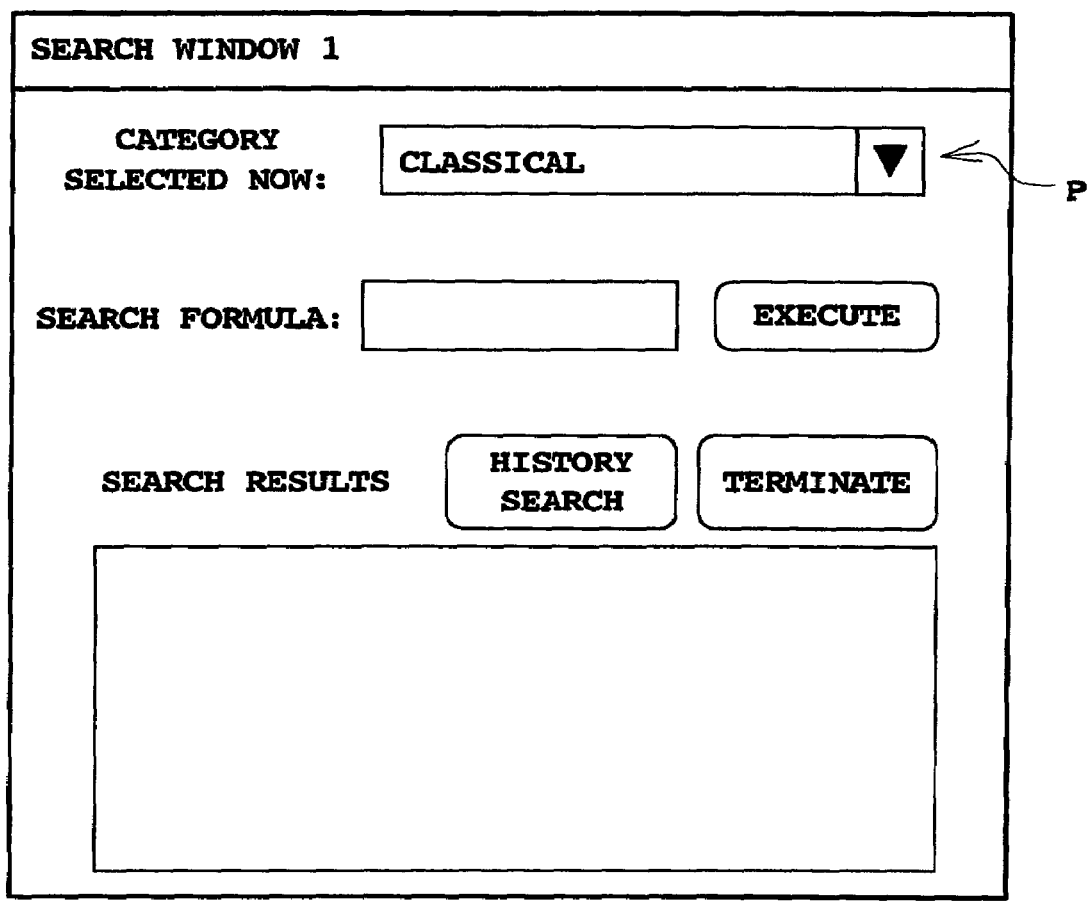
FIG. 8 shows an example search window in a GUI for the preferred embodiment of the invention.

The first user as a producer of search history records accesses the intermediate server 3 for authentication. The first user enters user ID on a login window which is illustrated in FIG. 8. The first user logs into the intermediate server 3 (S3) and enters conditions of a search on a search window such as that shown in FIG. 8. When the user issues a search request, the intermediate server executes a search (S4). In the illustrative window shown in FIG. 8, category "classical" is selected (P), and thus a search about classical music is executed.

A search history is displayed on a window such as that illustrated in FIG. 9, wherein search identifiers (I), search criteria (C), and hits obtained as search results (T) are tabulated. The search identifiers (I) can be used as search criteria. In the present example, a search with keyword "Bach" is executed and as shown on the first line of the table shown in FIG. 9, that is, the search with identifier "1" and criteria "Bach", returned 54,649 hits. When condition "1 * Instrumental Music" was added to the search 1, a search for information related to two keywords "Bach" and "Instrumental Music" was executed. A link to a window (FIG. 10) for listing the search results of the hits is embedded in the field of hits (T). By clicking on this link, the user can view the search results. The appearance of the search results window differs according to the characteristics of information searched out. In the example shown in FIG. 10, links for activating audition and download are provided with the search results.

In example of the present embodiment, "Delete" links are attached to the items of search history as shown in FIG. 9. Using these links, search histories that regarded as inappropriate can be deleted by a user who has chosen to have search history recorded by default. If the user chose not to have search history recorded at user registration, the function of these links is reversed and a "Record (history)" button replaces the "Delete" button.

When desired search results are obtained, the first user clicks the terminate button to terminate the search operation, enters information such as comment, and sends the intermediate server a request to record the results with the comment as search history (S5). The intermediate server 3 stores search history records in time sequence (S6), each record consisting of entries: ID of the user/registrant, contact, the identifier of the search recorded as search history, search criteria (including a category), search results, and comment. The intermediate server 3 sets a flag to each search history record. Among a series of search history records, this flag is set at "1" for the first record, "2" for the last record of the search results obtained immediately before terminating the search operation, and "0" for other records.

Usually, search history of a searcher, stored for one search operation, contains a series of search history records (a set of records). After accessing the intermediate server 3, the user often attempts a number of consecutive searches, changing the search criteria until the desired results are obtained. Thus, the flags are used to define the range of one search operation performed by a seeker. Specifically, referring to the flags of search history records in time sequence, the intermediate server 3 regards search history records between the record flagged "1" and the record flagged "2" as a series of records. If single search attempt returns desired search results, to the search history record thereof is assigned a flag "1", can be a flag "2" indicating it to be the most recent search. By referencing the flags assigned to search history records, a flag sequence "1," "0" . . . , "2," "1," "1" or "1," "0" . . . , "2," "2," "1" can detected. The "2" flag followed by flag "2", or the "1" flag followed by flag "1", that is, two successive identical flags, indicates the end of a series of search history records of one search operation and these records can be retrieved in a block.

If the search criteria specified in a search history record include reference to the search criteria of another record (the criteria including the search identifier of the reference record), the search history record preferably includes the search identifier of the reference record as a "parent search identifier". Similarly, the search history record having the search criteria referenced by another record includes the search identifier of the record referencing the earlier record as a "child search identifier". For example, when a first history record of a search executed with search criteria "Bach" (search identifier "1") and a second history record of another search executed with search criteria "1 * Instrumental Music" (search identifier "2") that makes reference to the search criteria in the first record, the first record with search identifier "1" includes a child search identifier "2" and the second record with search identifier "2" includes a parent search identifier "1."

Figure 10:
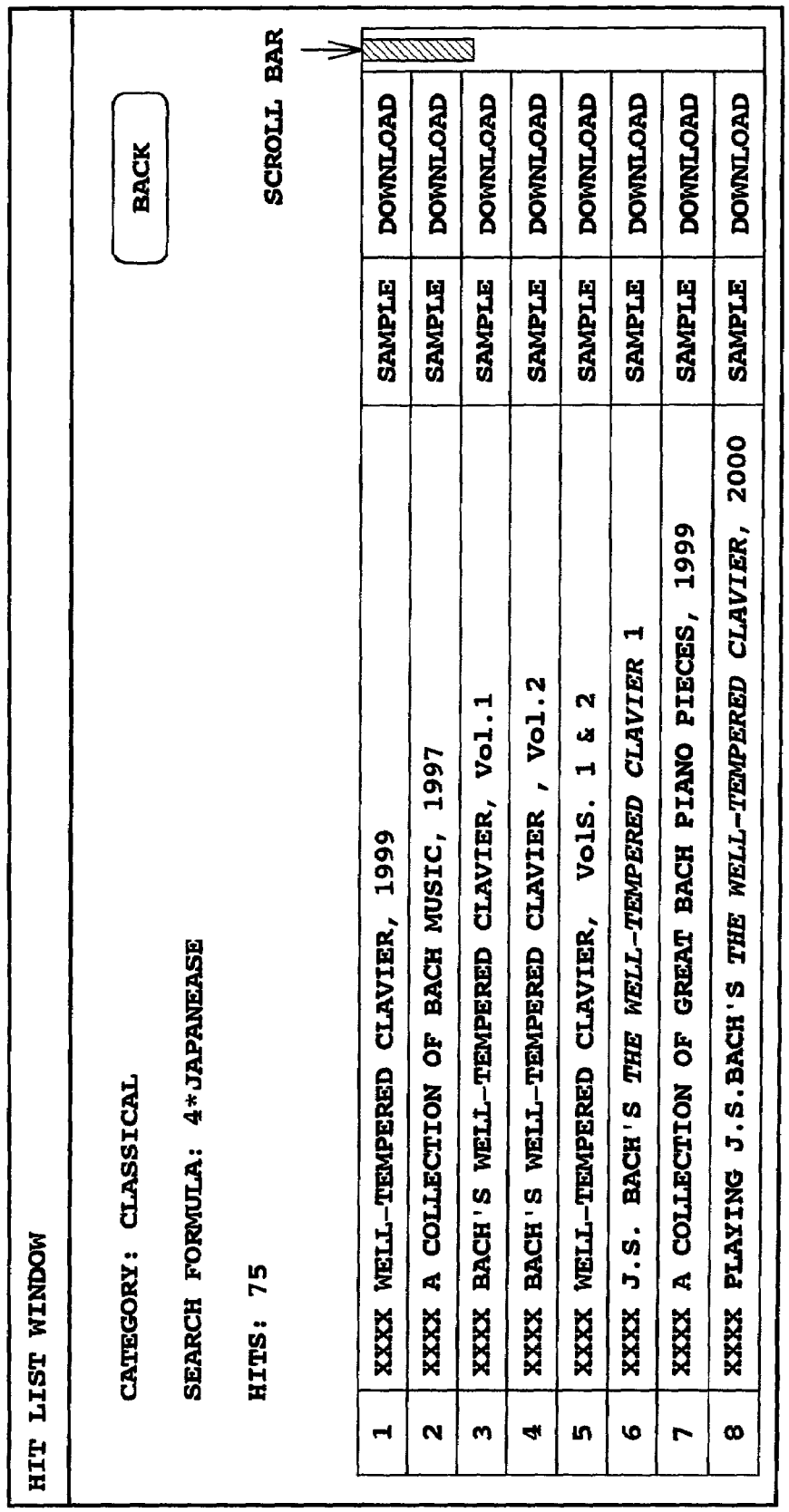
FIG. 10 shows an example past hits list window in a GUI for the preferred embodiment of the invention.

When the first user selects desired content out of his or her search results presented on the window shown in FIG. 10 and issues a request for retrieval of the content (S7), the intermediate server 3 sends to the central server 1 a request for retrieval of the content on behalf of the user (S8). The central server 1 authenticates the intermediate server 3 and distributes the content to the intermediate server 3 (S9). The intermediate server 3 transfers the retrieved content to the user terminal 2 of the first user (S10) and charges the first user for the content (S11). The central server 1 simultaneously notifies the intermediate server 3 of the charge for the content (S12). Payment is completed such that the intermediate server 3 collects from each user the charges for the content they receive through the intermediate server 3, and forwards the thus collected charges to the central server 1. Thus, information identifying the users that received the content is not transferred to the central server 1.

Figure 11:
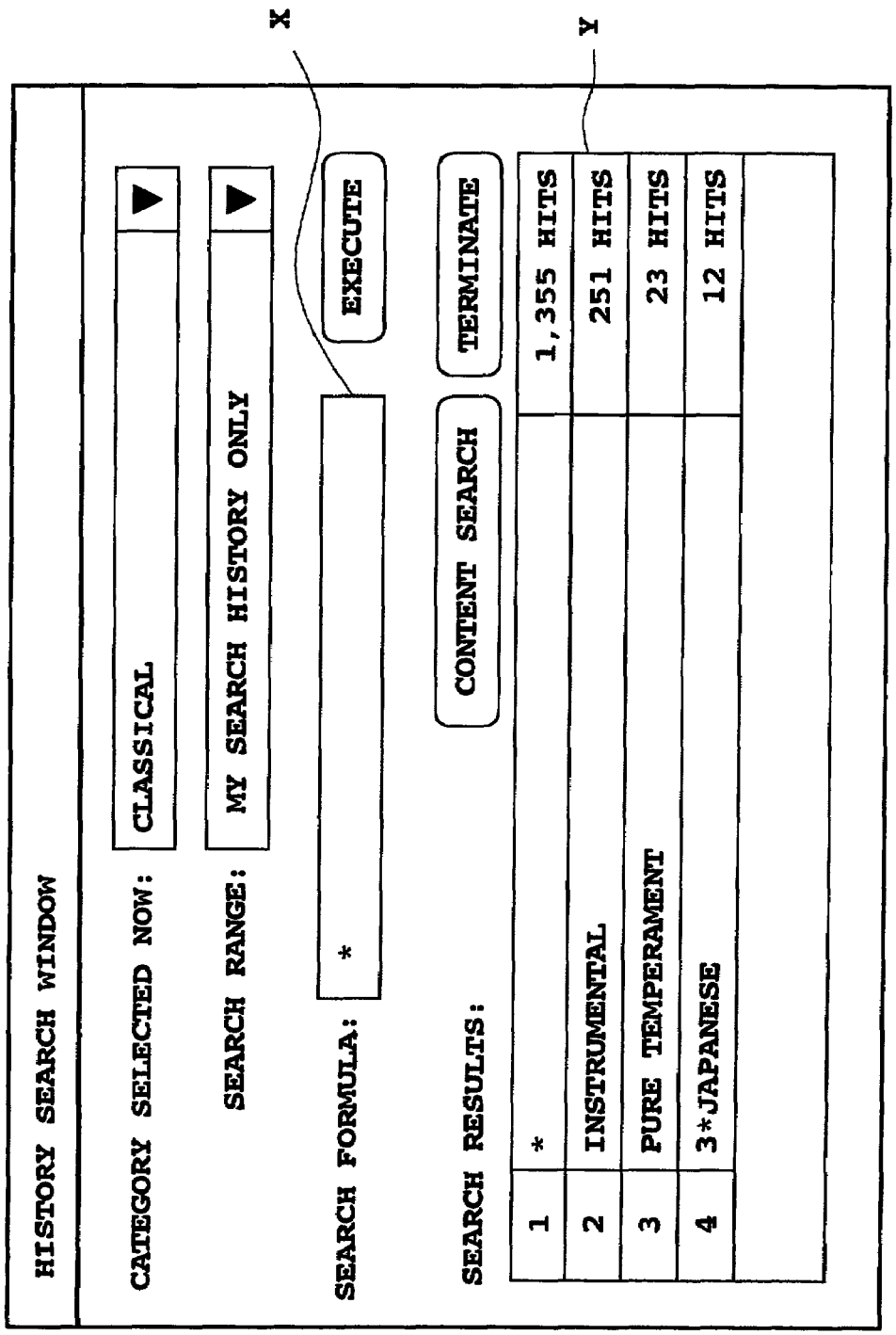
FIG. 11 shows an example history search window in a GUI for the preferred embodiment of the invention.

When a second user is authenticated by and logs onto the intermediate server 3 (S13), that user can issues a request to reference search history. For example, this request may be input by clicking the "History Search" button on a search window such as that shown in FIG. 8. When the "History Search" button is clicked, the intermediate server 3 presents a GUI window (web page) such as that shown in FIG. 11 to the user. A noticeable feature of the GUI window shown in FIG. 11 is that allows the user to specify a search range (X). Specifically, the window allows the user to select reference to the history of his or her past searches ("my search history only"), reference to search history under the category, or searching all search history records.

The second user enters conditions of a search and issues a request to search through open search history records. Returned search results are shown with search identifiers (Y) in the same manner as for a content search, so that a search identifier can be specified and included in search criteria. As the result of the history search, a web page like the one that is illustrated in FIG. 12 is presented. As illustrated in FIG. 12, for each series of search history records (record set), the first specified search criteria in the record set (the search criteria included in the record flagged "1" in the record set), time when the search was executed, and a link to the details of the record set are tabulated and shown (a list of search criteria (keywords); Z). In this table, when a "Ref. to a Series of Search Results" link is clicked, a series of search results for the record set is displayed (FIG. 13). If "my past search history" is referenced, it is preferable to attach a "Delete" link to each entry line of search history in the table shown in FIG. 13, thus enabling the user to delete his or her search history records.

The second user references search history in this way (S14) for content search reference. While history search is illustrated in this example, it is also possible to request the intermediate server to present search history records of a specific user (for example, the first user) to which, for example, the second user has attached a bookmark. It is also possible to enter keywords as conditions of a search and request the intermediate server to present search history records including comment akin to the keywords.

When the second user issues a request to retrieve content (S15), taking advantage of the search history records of another user, for example, the first user, the intermediate server 3 retrieves the content on behalf of the user (S16), transfers the content retrieved from the central server 1 to the second user (S17), and charges the second user for the content (S18). At the same time, the central server 1 notifies the intermediate server 3 of the charge for the content (S19).

Then, the intermediate server 3 credits the registrant (first user) with a reward for use of that search history record, reference to which occasioned the second user to get content. The credit is applied in such a way as to discount the charges owed by the first user (S20). The system for funding rewards such as discounts may preferably vary according to whether or not the intermediate server 3 and the content database 11 are operated by the same entity. More specifically, when the intermediate server 3 and the content database 11 are operated by a single corporation, the estimated reward value can be divided by the estimated value of content to be sold to calculate a markup value for the content. Then when determining a price per content article, this markup price is included to ensure that the venture is profitable (as the charge for content that the intermediate server is notified from the central server in the step S12). If the intermediate server 3 and the content database 11 are operated by separate companies or as separate concerns, the price per content article to be distributed (the price that the user is charged at step S11) may be determined by including a markup calculated by dividing the estimated cost of rewards to be offered by the estimated amount of content articles to be sold. Alternatively, at step S20, the service provider running the intermediate server 3 may require that the content distributor bear the burden of rewards. It is preferable that the charges assessed by the content distributor reflect the quantity of the content distributed.

Furthermore, at step S14, the second user is provided an opportunity to evaluate the search history records that he or she referenced. The evaluation points for a record are added up and retained in association with the record. The evaluation points are used to, for example, arrange the order of presentation of search history records according to the evaluation points awarded the content.

In the example used to illustrate the embodiment, the user selects content directly from the search results included in the referenced search history of a registrant and issues a request to get the content. It is also possible that the user references the search history of a registrant and attempts a further search through history records, modifying the search criteria and, based on the result of the further search, the user issues a request for content. In such a case, it is determined whether or not the user relied on the first search history when selecting content by comparing the of search results returned by the search subsequent to accessing of the first search history with the results included in the first search history (how many corresponding search results are included) or by comparing search criteria returned by the later search to those included in the first search history (how many corresponding keywords are included). Specifically, if a certain percentage of corresponding search results or search criteria are included, the intermediate server determines that the first search history was used when content was selected and therefore executes the step of rewarding the registrant of the first search history.

If the user chooses a search range other than "my search history only" on the GUI window shown in FIG. 11, that is, searching records of search history of someone else as well, a "Past Search by Other Searchers" link (Q) is attached to each entry item of a past search results table; its display is illustrated in FIG. 14. When the user clicks this link for a search result entry, a list of registrants of search history records related to that search result item is displayed (FIG. 15). Preferably, the registrants in this list can be arranged according to predetermined conditions. For example, the registrants in the list shown in FIG. 15 are arranged in the order of the number of hits (the count of the search history records appropriate for the category).

When the user clicks an entry (of a registrant of history search records), information about the search history records of the registrant is displayed (FIG. 16 (R)). In the list table (R) shown in FIG. 16, if comment accompanies an entry, its pop-up window (S) is shown when the mouse cursor is positioned at the entry. Furthermore, the intermediate server 3 makes and displays a "comment list" of the registrant by request (FIG. 17). Each comment in the comment list has a link to a web page on which a series of search history records related to the comment is displayed. This allows users that share a same interest to communicate with each other, and can even provide support forming interest groups or clubs over the network.

[Advantage Offering and Determining Its Limit]

Examples rewards to be given to the registrant (first user) of the referenced record in the step S 20 will be explained below. A reward may be in the form of, for example, virtual gift certificates (or discounts) that can be used when that user later purchases content, or in the form of a direct cash payment to the user. Preferably, the discount or the amount of money should be determined as follows.

Figure 18A:
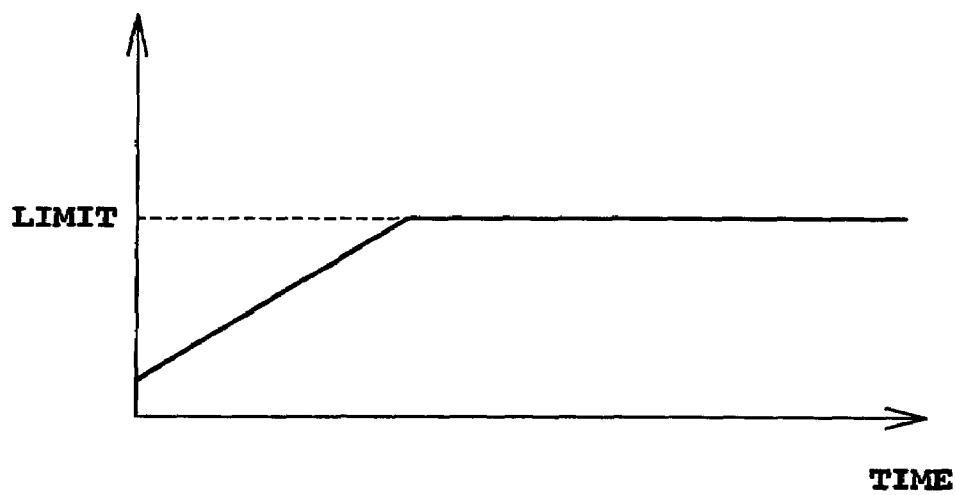
FIG. 18A illustrates an example of determining an amount of money to be given to a user.
Figure 18B:
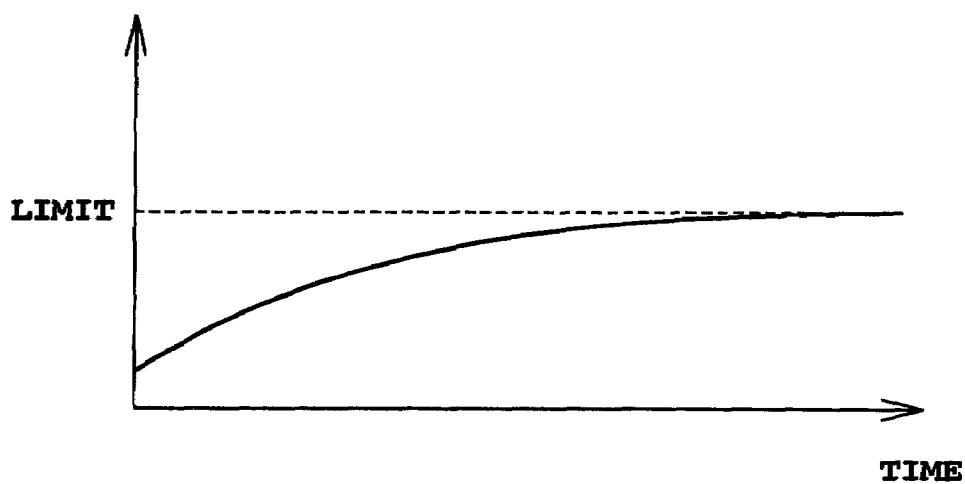
FIG. 18B illustrates another example an amount of money to be given to a user.

The discount or the amount of money as reward should be adjusted according to the elapsed time between the release of a content article and the time when the second user retrieves the content as a result of referencing the search history of the first user. Generally, content is more likely to be promoted through frequent advertisement or the like immediately after its release. However, as time passes after the release of the content, the content loses freshness and may be forgotten, such that opportunities for obtaining the content become more limited. Meanwhile, experience shows that some content, such as, for example, an old movie can be revived and become a hit because of nostalgia for the content and because the elapse of time has made it fresh for a new group of people. Therefore, it is preferable to adjust the value of the discount or cash reward according to a rule that the older the content article, the greater will be the reward. The frequency of access to the content is also taken into consideration. For a content article for which a certain period has passed after its release, for example, the reward system may be arranged such that when the count of occurrences of access to the content for a predetermined period becomes greater than a predetermined value, a cash reward is paid as an advertising cost to the registrant of search history records concerning the content, separately from step S 20. However, the size of this reward should be limited because too great a reward would be undesirable. For example, a limit as is shown in FIG. 18A can be set and the reward can be controlled not to exceed the limit. Alternatively, the reward value may be set to follow a curve that gradually comes close to the limit as is shown in FIG. 18B. It is also advisable to set the above amount at "0" or a small constant value during a certain period after the release of a content article.

For content such as news, conversely, the older the content, the lower will be its value, and it may be necessary to decrease the price of the content. Therefore, it is necessary to consider the price of the content when determining the size of the reward to be given to the registrant of the referenced record in step S20.

The size of a cash reward to be awarded at step S20 should be determined depending on how much the search history contributed to increasing the opportunities to distribute content (in other words, according to the value of the search history) and the price of the content when it is distributed. The value of the search history is determined, according to how old the related content is (the days that have passed after its release) and the rate of increase of access to the search history over time.

Because it is not desirable that the sum total of the discounts or awards to be given to the registrant of the referenced record exceed the charge for the content when many users referenced the search history record the total should preferably be limited. To ensure that such a limit is established, the cumulative total of the discounts or awards to be given to the registrant of the referenced search history record because other users referenced the record should be recorded as part of the search history record exemplified in FIG. 2. Prior to the execution of step S20, the intermediate server 3 identifies the referenced search history record and refers to the cumulative total included in the record. If the cumulative total exceeds a predetermined amount, the intermediate server does not execute step S20. If not, the server executes step S20 and adds the monetary value or equivalent given to be awarded to the registrant to the cumulative total.

[Special Users]

The size of a cash reward to be given to the registrant of the referenced search history record depends on the value of the record as described above, and moreover, the value of the record also depends on how other users view the record as well as the contents of the record. For example, when a reliable evaluation is established for search history records of a user, other users can expect to search out desired content more quickly by reference to these records, and, therefore, such potential utility of the records increases the commercial value of the records. As another example, search history records of a famous person may attract a great deal of attention. In view hereof, the commercial value of such records is regarded as high.

Therefore, users whose search history records have a relatively high commercial value should be distinguished as "special users" by attaching a "special user flag" to their records. Arrangement can be made for using these records as follows. When a user executes the step S14 for search reference, search results included in these records with the "special user flag" are not rendered to the user in the usual process. These search results are only provided to users who agree to pay an extra fee for referencing those results.

[Coping with Cancellation]

According to the above-described operation procedure, when a content article is sold or distributed to a user, a reward such as a discount is given to the registrant of the record referenced by the user who eventually selected the content. However, it is necessary to allow for instances when users cancel content purchases. The following arrangement may preferably cope with such situations. When a user chooses to buy a content article that was discovered as a result of reference to a search history record of someone else at step S15, the intermediate server presents a conformation message to the user; such as, for example, "Because you referenced a search history, this purchase agreement cannot be canceled. Do you agree?" Distribute the content in the steps S16 and S17 only when the user agrees.

[Using Authentication Information]

It is preferable that the user (registrant) to which advantage is given in the step S20 can be reliably authenticated. Therefore, user authenticating arrangements are made such that the central server 1 (or intermediate server 3) has one of a pair of keys and a user has the other key of the pair, wherein the pair of keys is unique to each user, and that user key data is set in the user's search history record as authentication information. By means of this arrangement, using a false name to earn rewards is prevented. For example, the central server 1 can execute the following authentication procedure before rewarding a registrant. When the first user purchases a content article (or the user search history record is created), the central server 1 generates key data to be attached to the record of the first user. The central server retains the key data linked with the first user identifying information and sends the key data to the first user's terminal device. The first user's terminal device encrypts the key data with the first user's private key which has been assigned beforehand and sends the encrypted key data to the intermediate server 3. The intermediate server 3 incorporates the encrypted key data into the user's search history record, thus retaining it. Thereafter, when the second user references the search history record of the first user at step S15, the encrypted key data included in the record is further encrypted with the second user's private key and sent to the central server 1. The central server 1 decrypts the double encrypted key data using the public key corresponding to the second user's private key (the public key can be obtained from a public key server or the like which is not shown). The central server 1 decrypts the encrypted key data with the public key of the first user, thereby reproducing the key data. The central server 1 compares the thus obtained key data with the key data retained by it, which was sent to the first user, and determines whether matching occurs. When matching occurs, the step of rewarding the first user is executed.

[Attaching Additional Information]

In the described preferred embodiment, comments are included in a search history record and GUI windows are configured so that comments can be shown (FIG. 16 (S)). However, it is preferable to allow users to search comments. For example, if a "my favorite" tag is attached to a comment, a search for search history records with the "my favorite" tag can be performed and this is preferable. In this case, it is convenient for searchers that a list of keywords is provided. It is preferable to allow users to select any keyword from the list of predetermined keywords (as well as enter free sentences) when entering comment.

It is also preferable to allow users to attach a "bookmark" tag to a search history record that the user once referenced during search operation. Specifically, the search history record exemplified in FIG. 2 includes information for identifying the user who attached a "bookmark" tag to it (bookmark placer information). The attacher of the bookmark is identified by this bookmark placer information. This "bookmark" tag is used in a search process and a user can quickly search for the search history records to which the user has attached a "bookmark" tag.

While comments and "bookmark" tags are used to facilitate the search process in the above example, the registrant of search history records can use them to arrange his or her own records. Although comments and "bookmark" tags were described above, a search history record may include other attribute information that can facilitate the search process.

[Application of the Invention to a Patent Search System]

In the information search system of the present preferred embodiment, the intermediate server 3 executes searches and the central server 1 only distributes the searched out content; that is, the central server 1 is not engaged in the processes of receiving conditions of a search and searching for content (an object to search). Attaching the intermediate server 3 to a corporate intra-net makes it possible to search information on the central server 1 without transmitting keywords of a search over an external network.

This advantage is useful for application such as pattern information searches in which it is undesirable that recent developments and technical achievements be disclosed to other corporations.

What is claimed is:

1. An intermediate server, comprising:

a providing unit that searches information in a central server based on a search request from a user on behalf of a user terminal and provides a search result to the user;

a retaining unit that retains the search result as a user search history being connected with the search request to specialize in a field of information based on the user's interest;

an index management unit that generates an index information in the specialized field of information for searching the information in the central server; and a storing unit that stores the index information, wherein the user search history is shared with a plurality of users and is used for supporting a user search operation, and the index management unit updates the index information when the information in the central server is updated, wherein, for the intermediate server, reference information including the field of information that the intermediate server specializes in and identification of the intermediate server is registered in the central server, the central server identifying, upon receipt of new information, the intermediate server associated with a field of the received new information, the central server sending update information to the identified intermediate server to notify the intermediate server of the receipt of the new information, and the index management unit contained in each of the intermediate server updating the index information according to the update information sent from the central server.

2. An information search method, comprising:

receiving a search request from a user;

searching information in a central server based on the search request;

providing a search result to the user; and retaining the search result as a user search history being connected with the search request at one of a plurality of intermediate servers that specialize in a field of information based on the user's interest, each of the plurality of intermediate servers comprising an index management unit that generates an index information of the information and a storing unit that stores the index information, the index management unit updating the index information when the information in the central server is updated, wherein the search result and a result of past searches are stored together at least one of the plurality of intermediate servers, and the user search history is shared with a plurality of users and is used for supporting a user search operation, wherein, for each of the intermediate servers, reference information including the field of information that the intermediate server specializes in and identification of the intermediate server is registered in the central server, the central server identifying, upon receipt of new information, one of the intermediate servers associated with a field of the received new information, the central server sending update information to the identified one of the intermediate servers to notify the identified one of the intermediate servers of the receipt of the new information, and the index management unit contained in each of the intermediate servers updating the index information according to the update information sent from the central server.

3. The information search method according to claim 2, wherein when the search request is executed by making reference to the user search history of another user, a process of rewarding to the user is executed.

4. An information search system for searching information, comprising:
   a central server having the information;
   a user terminal operated by a user;and
   a plurality of intermediate servers located between the central server and the user terminal, each of the plurality of the intermediate servers further comprising:
      a providing unit that searches the information in the central server based on a search request from the user on behalf of the user terminal and provides a search result to the user terminal;
      a retaining unit that retains the search result as a user search history being connected with the search request, wherein the user search history is shared with a plurality of users and is used for supporting a user search operation, wherein each of the plurality of intermediate servers specializes in a field of information based on a user's interest;
      an index management unit that generates an index information of the information; and
      a storing unit that stores the index information, the index management unit updating the index information when the information in the central server is updated,
   wherein, for each of the intermediate servers, reference information including the field of information that the intermediate server specializes in and identification of the intermediate server is registered in the central server,
   the central server identifying, upon receipt of new information, one of the intermediate servers associated with a field of the received new information, the central server sending update information to the identified one of the intermediate servers to notify the identified one of the intermediate servers of the receipt of the new information, and
   the index management unit contained in each of the intermediate servers updates the index information according to the update information sent from the central server.

5. The information search system according to claim 4, wherein the search result and a result of past searches are stored together.

6. The information search system according to claim 4 wherein at least one of the plurality of intermediate servers retains retaining information about the field of specialization of another intermediate server on the retaining unit.

7. The information search system according to claim 6, wherein one of the plurality of intermediate servers further comprises a searching unit that searches the other intermediate server based on a field of key data which is attached to the user search history and provides the search result to the user terminal.

8. The information search system according to claim 4, wherein, when the search request is executed by making reference to the user search history of another user, at least one of the intermediate servers executes a process of rewarding to the user.

9. The information search system according to claim 8, wherein a reward is an amount of money, and no reward is given when the reward exceeds a predetermined amount of money.

10. The information search system according to claim 4, wherein the user search history has information about time when the information is searched, and the user search history is deleted after a predetermined period of the time has passed.

11. The information search system according to claim 4, wherein the user search history includes an evaluation information by another user who refers the user search history, and the evaluation information is used for a process of presenting the user search history.

12. The information search system according to claim 4, wherein at least one of the intermediate servers is determined by a user based on the search request and the user terminal retains an identifier of the at least one determined intermediate server.

13. The information search system according to claim 4, wherein each of the plurality of intermediate servers searches the index information stored in a storing unit for searching the information based on the search request.

14. A storage medium readable by a computer, the storage medium storing a program of instructions executable by the computer to perform a function for searching information based on a search request from a user, the function comprising:
   receiving the search request from the user;
   searching the information in a central server based on the search request;
   providing a search result to the user; and
   retaining the search request as a user search history being connected with the search request at one of a plurality of intermediate servers that specialize in a field of information based on the user's interest, each of the plurality of intermediate servers comprising an index management unit that generates an index information of the information and a storing unit that stores the index information, the index management unit updating the index information when the information in the central server is updated, wherein the search result and the results of past searches are stored together at least one of the plurality of intermediate servers, and the user search history is shared with a plurality of users and is used for supporting a user search operation,
   wherein, for each of the intermediate servers, reference information including the field of information that the intermediate server specializes in and identification of the intermediate server is registered in the central server,
   the central server identifying, upon receipt of new information, one of the intermediate servers associated with a field of the received new information, the central server sending update information to the identified one of the intermediate servers to notify the identified one of the intermediate servers of the receipt of the new information, and
   the index management unit contained in each of the intermediate servers updating the index information according to the update information sent from the central server.

15. The information search method according to claim 3, wherein a reward is an amount of money, and no reward is given when the reward exceeds a predetermined amount of money.

* * * * *